US008069051B2

(12) United States Patent
Lindahl et al.

(10) Patent No.: US 8,069,051 B2
(45) Date of Patent: Nov. 29, 2011

(54) ZERO-GAP PLAYBACK USING PREDICTIVE MIXING

(75) Inventors: Aram Lindahl, Menlo Park, CA (US); Anthony J. Guetta, Palo Alto, CA (US)

(73) Assignee: Apple Inc., Cupertino, CA (US)

( * ) Notice: Subject to any disclaimer, the term of this patent is extended or adjusted under 35 U.S.C. 154(b) by 1094 days.

(21) Appl. No.: 11/860,786

(22) Filed: Sep. 25, 2007

(65) Prior Publication Data

US 2009/0083047 A1 Mar. 26, 2009

(51) Int. Cl.
*G10L 21/04* (2006.01)
*G10L 19/00* (2006.01)
*H04B 15/00* (2006.01)
*G06F 7/38* (2006.01)

(52) U.S. Cl. ........ 704/503; 704/500; 381/94.4; 708/290

(58) Field of Classification Search ........................ None
See application file for complete search history.

(56) References Cited

U.S. PATENT DOCUMENTS

| 7,023,488 | B2 * | 4/2006 | Szybiak et al. | 348/484 |
| 7,292,902 | B2 * | 11/2007 | Smithers et al. | 700/94 |
| 7,302,396 | B1 * | 11/2007 | Cooke | 704/500 |
| 7,782,808 | B2 * | 8/2010 | Suh et al. | 370/312 |
| 2008/0046252 | A1 * | 2/2008 | Zopf et al. | 704/501 |
| 2008/0056511 | A1 * | 3/2008 | Zhang et al. | 381/94.4 |

FOREIGN PATENT DOCUMENTS

WO WO 0146957 A1 * 6/2001

OTHER PUBLICATIONS

Esquef, P. "Interpolation of long gaps in audio signals using the warped Burg's method," Proceedings of the 6th Int. Conference on Digital Audio Effects, 2003.*
Cisowski, K.; Niedzwiecki, M.; "Smart copying-a new approach to reconstruction of audio signals," Circuits and Systems, 1999. ISCAS '99. Proceedings of the 1999 IEEE International Symposium on, Issue Date: Jul 1999, On pp. 58-63 vol. 4.*

* cited by examiner

*Primary Examiner* — Matthew Sked
(74) *Attorney, Agent, or Firm* — Park, Vaughn, Fleming & Dowler LLP; Steven E. Stupp

(57) ABSTRACT

Circuits and methods for providing zero-gap playback of consecutive data streams in portable electronic devices, such as media players, are described. In some embodiments, a circuit includes a decoder circuit configured to receive encoded audio data and to output decoded audio data including data streams associated with a data file and a subsequent data file. Moreover, a predictive circuit, which is electrically coupled to the decoder circuit, is configured to selectively generate additional samples based on samples in the data file, where the additional samples correspond to times after the end of a data stream associated with the data file. Additionally, a filter circuit, which is electrically coupled to the decoder circuit and selectively electrically coupled to the predictive circuit, is configured to selectively combine or blend samples at a beginning of the subsequent data file with the additional samples. Note that the circuit may be included in an integrated circuit.

20 Claims, 8 Drawing Sheets

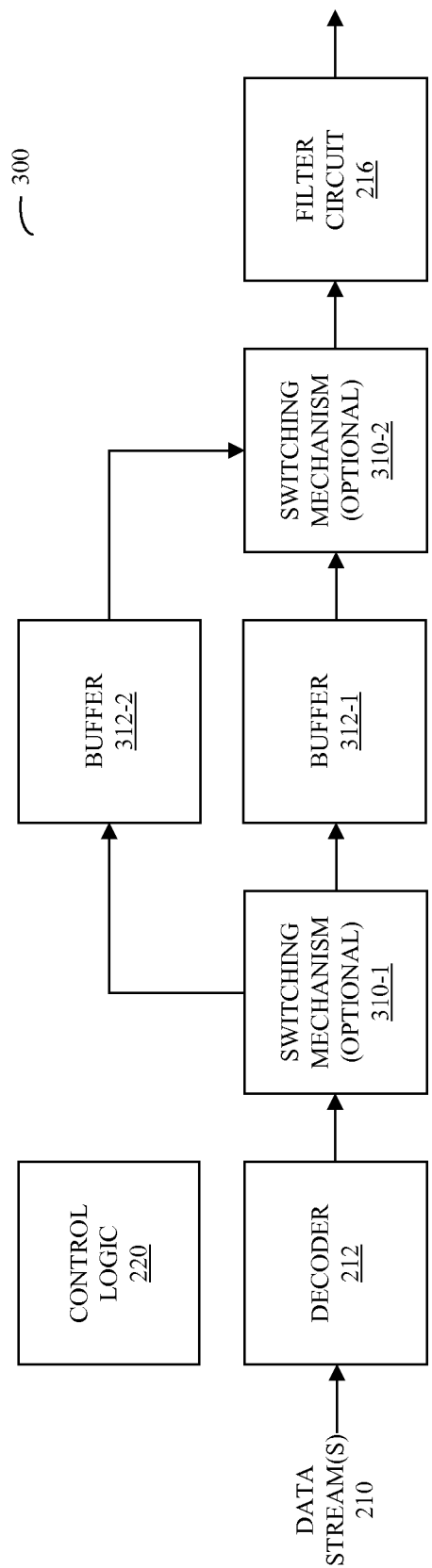

PREDICTED DATA 710-1

PREDICTED DATA 710-2

...

TIME (OPTIONAL) 712-1

SAMPLE 714-1

TIME (OPTIONAL) 712-2

SAMPLE 714-2

ZERO-GAP PLAYBACK USING PREDICTIVE MIXING

BACKGROUND

1. Field of the Invention

The present invention relates to techniques for smoothly transitioning between consecutive data streams. More specifically, the present invention relates to circuits and methods for providing zero-gap playback of consecutive data streams using predictive mixing.

2. Related Art

Portable electronic devices, such as media players, are becoming increasingly popular. These devices allow users to store and playback a variety of media files, such as audio files containing music. In order to enjoy a continuous stream of music, users typically queue multiple media files, such as those in a play list, for playback.

However, there are often 'breaks' or 'gaps' in this continuous stream at the beginnings and/or the endings of media files, which may degrade the overall user experience. For example, there is often a header and/or a trailer in a given audio file that does not include music. These headers and trailers may include a fixed time interval associated with a media application/encoder that was used to generate the given audio file (including any warm-up time and/or delays associated with the encoder), as well as a variable time interval associated with how the given audio file was generated (including factors such as the window size and the sampling rate). Moreover, the music in many songs progressively ramps up at the beginning and/or slowly ramps down at the end. These intervals effectively add to the headers and/or trailers and increase the size of the gaps between consecutive songs in a play list.

Since these gaps degrade the overall user experience, it is often advantageous to reduce or to eliminate them. For example, during radio broadcasts many disc jockeys routinely start a subsequent song prior to the end of the preceding song. This approach may be implemented in electronic devices using multiple decoders. For example, one decoder may decode an audio file associated with the current song and another decoder may decode an audio file associated with the subsequent song. By transitioning between the data streams output by these decoders, the gap during consecutive playback of these audio files may be reduced or eliminated. Alternatively, a single decoder may be used with a large memory or buffer, which can be used to simultaneously store decoded data streams for multiple audio files, thereby facilitating transitions between these audio files during playback.

However, it may be difficult to use these techniques in portable electronic devices. For example, due to the limited energy capacity of batteries, as well as cost constraints, many portable devices do not have multiple decoders and/or have a limited amount of memory. These limitations and constraints make it difficult to reduce or eliminate gaps during playback of consecutive audio files.

Hence what is needed is a method and an apparatus that facilitates playback of consecutive data streams without the above-described problems.

SUMMARY

Circuits and methods for providing zero-gap playback of consecutive data streams in portable electronic devices, such as media players, are described. In these techniques, a prediction circuit is used to generate additional samples near to and/or after the end of a data stream associated with a data file. Then, these additional samples are selectively combined with samples in a data stream associated with a subsequent data file, thereby reducing or eliminating the gap between these data streams.

In some embodiments, a circuit includes a decoder circuit configured to receive encoded audio data and to output decoded audio data including data streams associated with the data file and the subsequent data file. Moreover, the predictive circuit, which is electrically coupled to the decoder circuit, is configured to selectively generate additional samples based on samples in the data file, where the additional samples correspond to times after the end of a data stream associated with the data file. Additionally, a filter circuit, which is electrically coupled to the decoder circuit and selectively electrically coupled to the predictive circuit, is configured to selectively combine or blend samples at the beginning of the subsequent data file with the additional samples. Note that this circuit may be included in one or more integrated circuits.

By selectively combining the samples with the additional samples, the circuit may reduce a discontinuity, such as an intensity discontinuity and/or a phase discontinuity (e.g., due to timing differences), in samples at the end of the data file and samples at the beginning of the subsequent data file. Note that selectively combining the samples with the additional samples may include fading out the additional samples and fading in the samples at the beginning of the subsequent data file.

Moreover, the decoder circuit may be configured to trim portions of two adjacent data files. For example, the decoder circuit may remove an end portion of the data file and/or a beginning portion of the subsequent data file.

In some embodiments, the circuit includes control logic which is configured to detect the end of the data file and configured to selectively electrically couple the predictive circuit to the filter circuit. Moreover, the control logic may be configured to enable the selective combining and/or to activate the predictive circuit when the end of the data file is detected. When activated, the predictive circuit may be trained.

Moreover, the circuit may include a memory buffer, which is electrically coupled to the decoder circuit and the filter circuit.

Note that the predictive circuit may include a filter, such as a filter with a finite impulse response and/or an infinite impulse response. This filter may include an adaptive filter.

In some embodiments, selective generation of the additional samples by the predictive circuit includes extrapolating the samples in the data file. Consequently, the predictive circuit may selectively extrapolate samples in a first of the two adjacent data files to generate the additional samples.

Another embodiment provides a portable device, which includes an audio codec that is configured to decode and playback encoded data files and is configured to reduce the discontinuity in samples at the end of the data file and samples at the beginning of the subsequent data file by combining the samples in the subsequent data file with the additional samples extrapolated from the samples in the data file.

Another embodiment provides a method for reducing media discontinuities in a device, such as a portable device. During operation, the device detects the end of the data file which includes audio data. Next, the device may remove the end portion of the data file and/or the beginning portion of a subsequent data file. Then, the device generates additional samples based on samples in the data file and combines samples at the beginning of the subsequent data file with the additional samples. Note that the additional samples may correspond to times after the end of a data stream associated with the data file.

Another embodiment provides a computer system. This computer system may execute instructions corresponding to at least some of the above-described operations. Moreover, these instructions may include high-level code in a program module and/or low-level code that is executed by a processor in the computer system.

Another embodiment relates to a computer program product for use in conjunction with the portable device and/or computer system. This computer program product may include instructions corresponding to at least some of the above-described operations.

BRIEF DESCRIPTION OF THE FIGURES

FIG. 3 is a block diagram illustrating a circuit to reduce media discontinuities in accordance with an embodiment of the present invention.

FIG. 7 is a block diagram illustrating a data structure in accordance with an embodiment of the present invention.

Note that like reference numerals refer to corresponding parts throughout the drawings.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Embodiments of hardware, software, and/or processes for using the hardware and/or software are described. Note that hardware may include a circuit, a device (such as a portable device), and/or a system (such as a computer system), and software may include a computer program product for use with the computer system. Moreover, in some embodiments the portable device and/or the system include one or more of the circuits (e.g., in one or more integrated circuits).

These circuits, devices, systems, computer program products, and/or processes may be used to provide zero-gap or reduced-gap transitions between data streams during playback of media files, such as audio files. Moreover, this may be accomplished using a single decoder or decoding module and/or a limited amount of memory via predictive mixing. In particular, additional samples near and/or after the end of a data stream associated with the data file may be predicted or extrapolated. Then, these additional samples may be combined or blended with samples at the beginning of the subsequent data file.

In this way, the actual end of the data file may not be played. Instead, the predicted additional samples may be played, thereby allowing the decoder to begin processing of the subsequent data file sooner and reducing the amount of memory used. Moreover, by mixing the additional samples with the samples in the subsequent data file discontinuities (such as an intensity discontinuity and/or a phase discontinuity, for example, due to timing differences) during the transition between the data streams associated with these data files may be reduced or eliminated. Because these discontinuities can be perceived by users, these techniques may therefore improve a user experience by allowing users to seamlessly play back consecutive data files.

These techniques may be used in a wide variety of devices and/or systems. For example, the device and/or the system may include: a personal computer, a laptop computer, a cellular telephone, a personal digital assistant, an MP3 player, a portable television, an iPod (a trademark of Apple, Inc.), an iPhone, and/or a device that plays back one or more types of media. Moreover, the media may include: audio files, video files, and/or data files. In the discussion that follows, audio data files are used as an illustrative example.

Figure 1A:
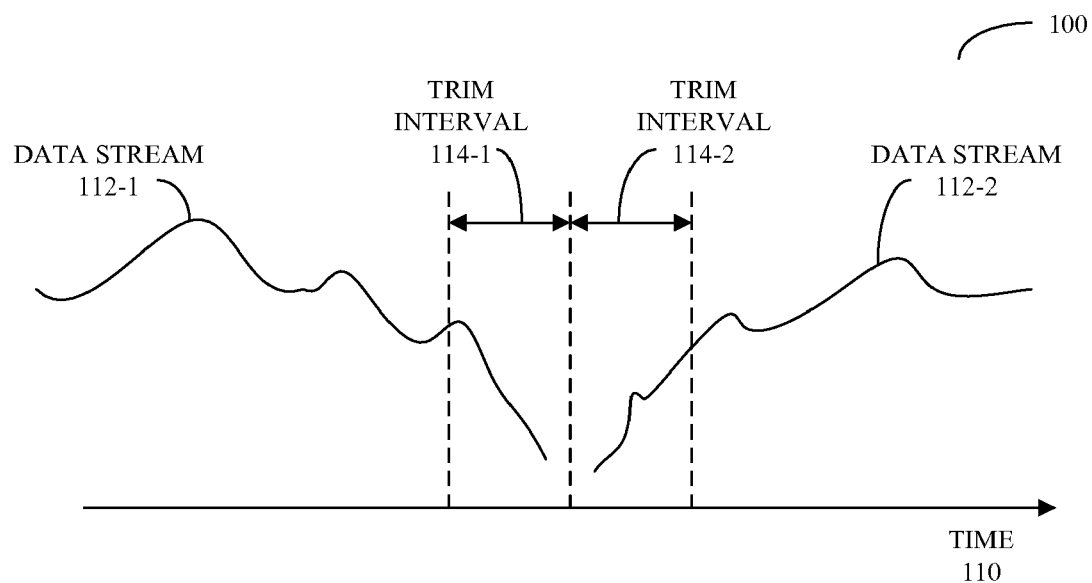
FIG. 1A is a graph illustrating data streams in accordance with an embodiment of the present invention.

Techniques to reduce or eliminate discontinuities in data streams associated with consecutive data files in accordance with embodiments of the invention are now described. FIG. 1A presents a graph 100 illustrating data streams 112 as a function of time 110. If the encoder or encoding technique used to generate the data streams 112 is known, it may be possible to splice the data streams 112 together to reduce or eliminate the gap between them. For example, trim intervals 114 at the end of data stream 112-1 and/or the beginning of data stream 112-2, respectively, may be removed and the remainder of the data streams 112 may be spliced together.

When the data streams 112 are spliced together (which may occur after either or both of the trim intervals 114 are removed) one or more discontinuities, such as intensity and/or a phase discontinuity, may result. For example, the discarded samples at the end of a first track or song and those at the beginning of a subsequent track or song may be a best guess that is not known with certainty. Moreover, these tracks may have different volume adjustments and/or different post-processing (such as different equalization). Additionally, a discontinuity may occur if the tracks are subsequently played out of order (such as when songs are shuffled) or if the tracks are poorly encoded.

Figure 1B:
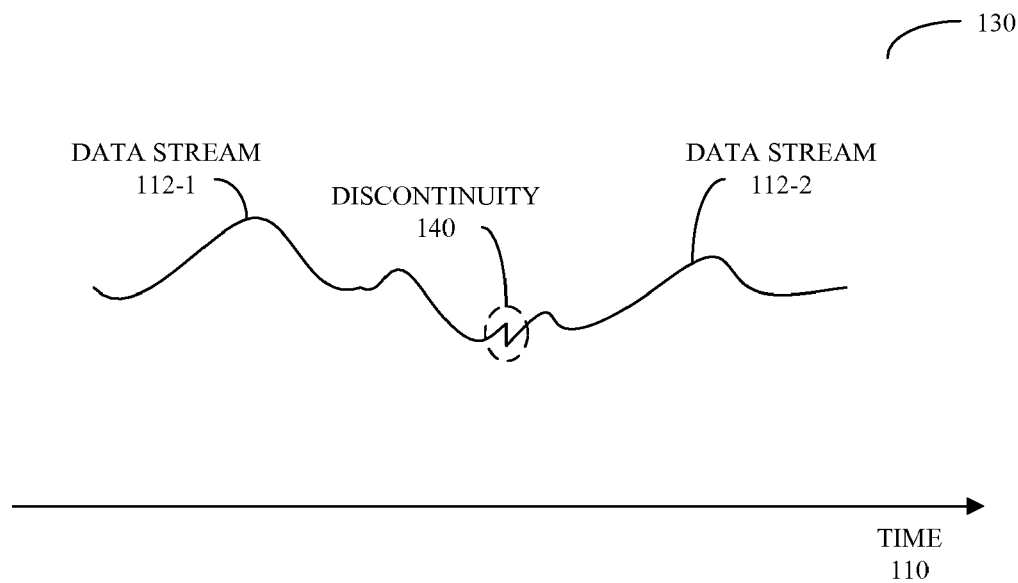
FIG. 1B is a graph illustrating data streams in accordance with an embodiment of the present invention.

An example of a such discontinuity is shown in FIG. 1B, which presents a graph 130 illustrating data streams 112 as a function of time 110. In this example, spliced data streams 112 have a discontinuity 140, which may be perceived by a user. For example, discontinuity 140 may produce an audible click or a change in the beat or tempo that a listener can hear.

Figure 1C:
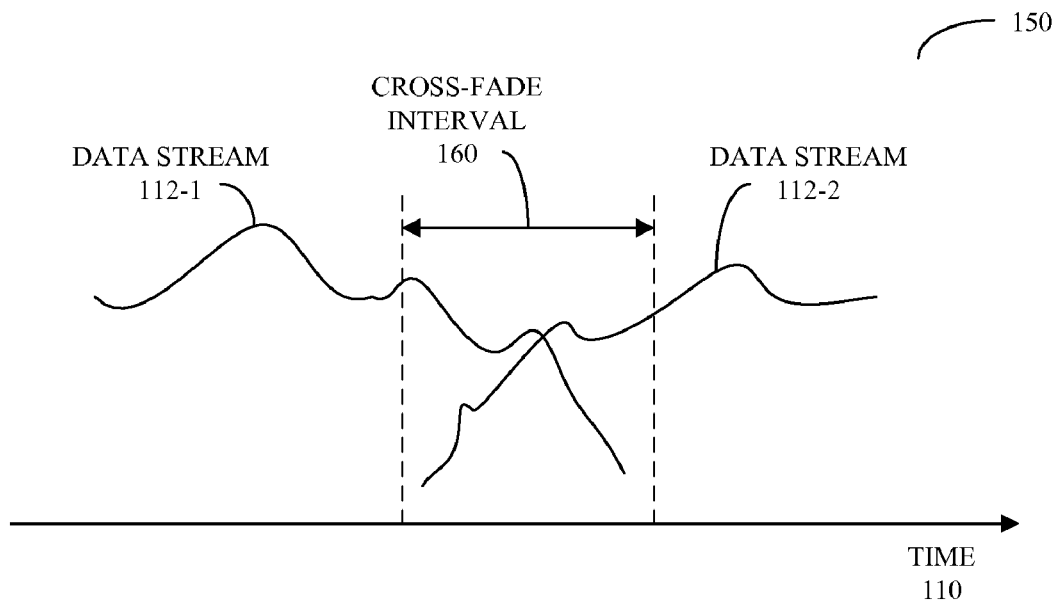
FIG. 1C is a graph illustrating data streams in accordance with an embodiment of the present invention.

Because discontinuities, such as discontinuity 140, can degrade the user experience, a variety of techniques may be used to reduce or eliminate the discontinuities (or the user's ability to perceive them). One technique is shown in FIG. 1C, which presents a graph 150 illustrating data streams 112 as a function of time 110. In this example, portions of the data streams 112 are overlapped during cross-fade interval 160. Note that this overlay operation may occur after either or both of the trim intervals 114 in FIG. 1A are removed. Alternatively, the overlay operation (and the cross-fade operation described below) may be used separately from removal of either or both of the trim intervals 114 in FIG. 1A.

Next, the amplitude of data stream 112-1 may be progressively reduced (faded-out) as a function of time 110 and/or the amplitude of data stream 112-2 may be progressively increased (faded-in) as a function of time 110. This cross-fade operation may reduce or eliminate the discontinuity 140 (FIG. 1B) or the user's ability to perceive the discontinuity 140 (FIG. 1B). Moreover, it may also be used to provide seamless playback (e.g., zero-gap playback) of consecutive data files.

However, it may be difficult to perform the cross-fade operation, such as when the encoder or media application used to generate either of the data files that data streams 112 are associated with is unknown or when the data streams 112 do not include proper markers (such as an end-of-file marker). Moreover, in order to utilize the technique illustrated in FIG. 1C to reduce or eliminate discontinuities, a playback device may have more than one decoder (to concurrently provide the data streams 112) and/or a large memory (to store and time shift the data streams 112). As noted previously, these system requirements may be prohibitive in low-cost electronic devices that have storage components (such as batteries) with limited energy capacity, such as many portable electronic devices. Moreover, synchronizing concurrent data streams and/or time shifting stored data streams may increase the complexity of these electronic devices.

These challenges may be addressed by using additional computations to reduce the number of decoders, the amount of memory, and/or the complexity of electronic devices, such as portable electronic devices. In particular, when the end of the data file associated with data stream 112-1 is detected, a predictive circuit may be used to generate additional samples. For example, the additional samples may be extrapolated from previous samples in data stream 112-1. Then, the decoding of data stream 112-1 may cease prior to beginning the decoding of data stream 112-2, and the additional samples may be selectively combined with samples near the beginning of data stream 112-2 to reduce or eliminate any discontinuities. In this way, a single decoder and/or a reduced amount of memory may be used in the portable electronic device while providing seamless playback of consecutive data files associated with the data streams 112. Note that by combining the additional samples with at least a portion of the data stream 112-2 (for example, during a cross-fade interval), time duration may be maintained across multiple tracks or sings, thereby avoiding tempo changes.

Figure 1D:
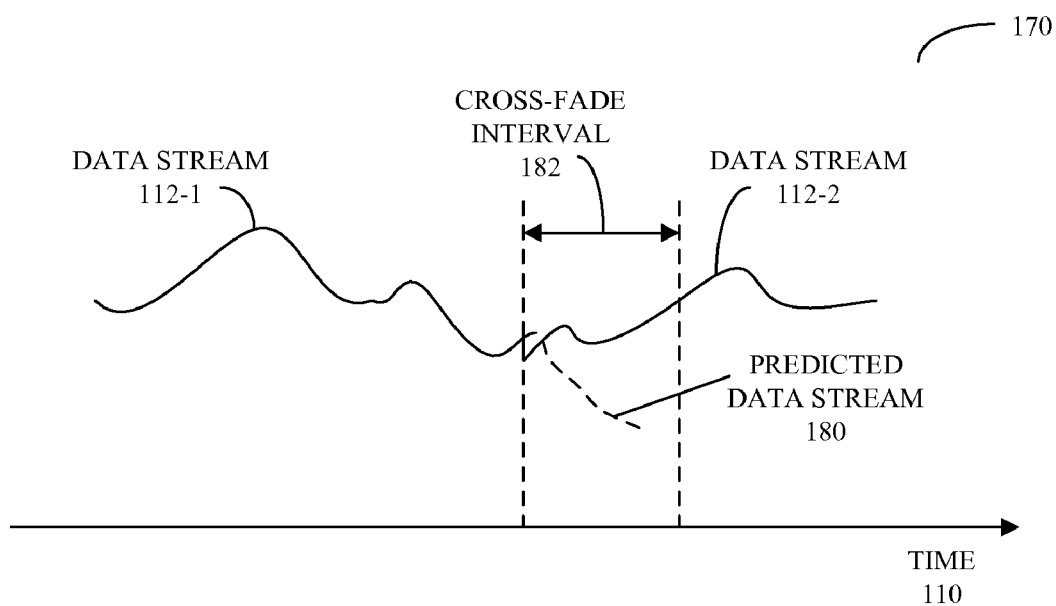
FIG. 1D is a graph illustrating data streams in accordance with an embodiment of the present invention.

This technique is shown in FIG. 1D, which presents a graph 170 illustrating data streams 112 as a function of time 110. In particular, predicted data stream 180 is generated based on at least a portion of data stream 112-1. Moreover, during cross-fade interval 182 the amplitude of predicted data stream 180 is progressively reduced as a function of time 110 and/or the amplitude of data stream 112-2 is progressively increased as a function of time 110.

Figure 2A:
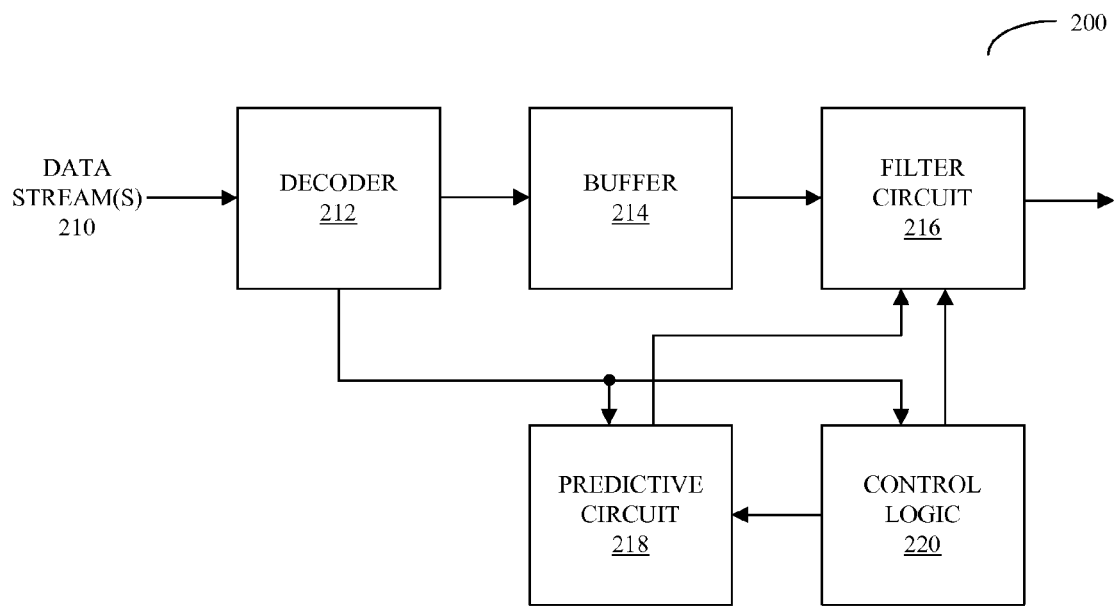
FIG. 2A is a block diagram illustrating a circuit to reduce media discontinuities in accordance with an embodiment of the present invention.

Circuits to reduce or eliminate discontinuities in data streams associated with consecutive data files in accordance with embodiments of the invention are now described. FIG. 2A presents a block diagram illustrating a circuit 200 to reduce media discontinuities. In this circuit, decoder 212 may receive data stream(s) 210 associated with one or more consecutive data files in a sequence of data files (e.g., songs in a play list or an album), which include encoded data. In some embodiments, the data stream(s) 210 are received from a memory (such as a buffer).

In an exemplary embodiment, the encoded data includes encoded audio data. This audio data may be compatible with a variety of encoding or file formats, including: Advance Audio Coding (AAC), High Efficiency Advance Audio Coding (HE-AAC), an MPEG standard (such as MP3), Algebraic Code Excited Linear Prediction (ACELP), Apple Lossless Audio Codec (ALAC), Wave (WAV), Audio Interchange File Format (AIFF), Adaptive Multi-Rate (AMR), an Interactive Media Association (IMA) standard, and/or a QDesign Music Codec, as well as other encoding or file formats. However, note that the circuit 200 may be used to decode a variety of types of media, such as video and/or encrypted data.

Decoder 212 may output decoded data to a memory, such as buffer 214, to which it is electrically coupled. This buffer may include a wide variety of types of memory, including: DRAM, SRAM, Flash, solid-state memory, volatile memory, and/or non-volatile memory. Buffer 214 may store the decoded data until it is consumed by hardware consumer (such as one or more audio circuits and speakers) on behalf of a media playback application or software that executes in the device and/or the system which includes the circuit 200. When the decoded data is consumed (e.g., the decoded data is output to the hardware consumer), the consumed decoded data may be removed from the buffer 214. Alternatively, consumed decoded data is no longer needed in the buffer 214 and may be subsequently overwritten or erased. As discussed below, buffer 214 may also allow samples in the data stream(s) 210 associated with the subsequent data file to be time shifted, thereby facilitating combining of these samples with additional samples provided by predictive circuit 218.

Decoded data may also be output to predictive circuit 218 and/or control logic 220, which may be electrically coupled to decoder 212. Based on instructions or commands from control logic 220, predictive circuit 218 may be used to selectively generate the additional samples based on samples in the data stream(s) 210 associated with the data file in the consecutive data files. For example, when the control logic 220 detects an end-of-file in the data stream(s) 210, control logic 220 may power on or warm up the predictive circuit 218. Moreover, in some embodiments the predictive circuit 218 is selectively electrically coupled to the decoder 212 by a switching mechanism (not shown), which may be controlled by control logic 220.

Predictive circuit 218 may include a filter, such as a filter having a finite impulse response and/or an infinite impulse response. This filter may include an adaptive filter. Consequently, during warm up the predictive circuit 218 may be trained. For example, filter may be adapted based on a training sequence (which may be associated or derived from the data stream(s) 210) using a least-mean-square or a normalized least-mean-square technique. In an exemplary embodiment, the filter includes a low-pass filter and has 30 taps.

Once warmed up and/or selectively electrically coupled to the decoder 212, the predictive circuit 218 may generate the additional samples, for example, by extrapolating previous samples in the data stream(s) 210 associated with the data file. These samples may be provided to a filter circuit 216 that is electrically coupled to the predictive circuit 218. Note that these additional samples may include samples after the end of a data stream associated with the data file.

Figure 2B:
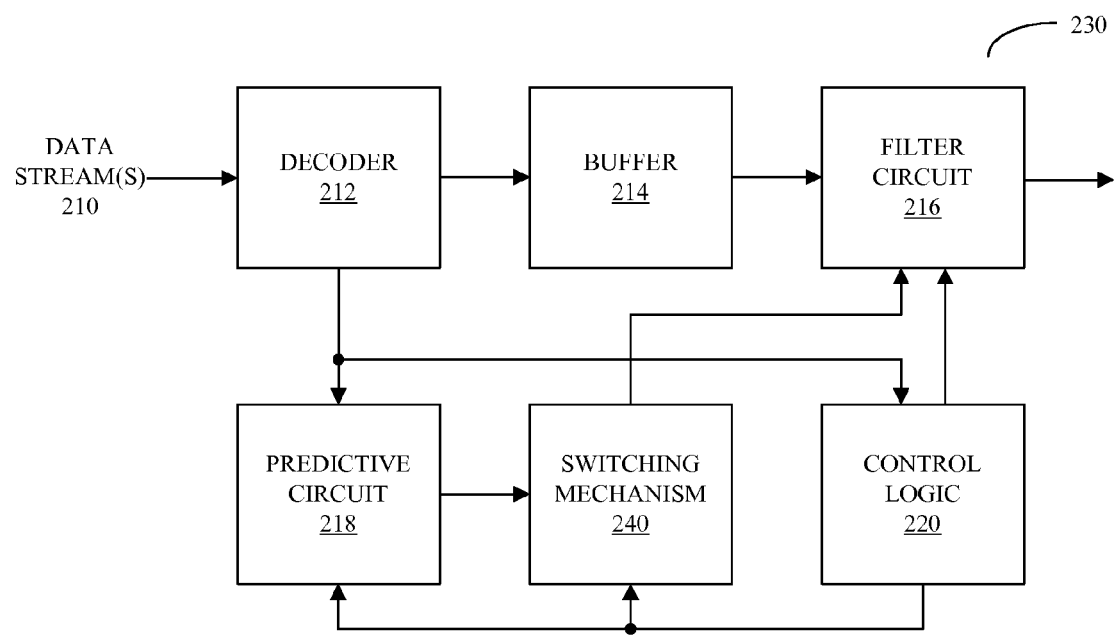
FIG. 2B is a block diagram illustrating a circuit to reduce media discontinuities in accordance with an embodiment of the present invention.

Alternatively, the additional samples provided by the predictive circuit 218 may be selectively electrically coupled to the filter circuit 216 by a switching mechanism, such as a switch. This switching mechanism 240 is shown in FIG. 2B, which presents a block diagram illustrating a circuit 230 to reduce media discontinuities. In this embodiment, the switching mechanism 240 may selectively electrically couple the predictive circuit 218 and the filter circuit 216 based on instructions or commands from the control logic 220.

During a time interval (such as the cross-fade interval 182 in FIG. 1D), control logic 220 may instruct the filter circuit 216 to selectively combine the additional samples with decoded samples associated with a subsequent data file in the consecutive data files. For example, the filter circuit 216 may perform operations including mixing, combining, blending, and/or cross-fading on the additional samples and the decoded samples at the beginning of the subsequent data file.

Note that the selective combining may be combined with trimming of either or both of the trim intervals 114 (FIG. 1A) in the data file and the subsequent data file. This trimming operation may be performed by the decoder 212 (e.g., based on instructions or commands from control logic 220).

By selectively combining the additional samples with the samples associated with the subsequent data file and/or trimming the data stream(s) 210 associated with these data files, circuits 200 and/or 230 (FIG. 2B) may be used to reduce or eliminate discontinuities during playback of consecutive data files, which may facilitate zero-gap playback. Moreover, these techniques may facilitate the use of a single decoder 212 and/or a smaller buffer 214. For example, buffer 214 may be reduced to a few percent of the memory needed to store decoded data associated with two songs. In an exemplary embodiment, buffer 214 is a few percent of 128 kB.

As noted previously, the preceding techniques and circuits may be used with data files that include other type of media. For example, with video data buffer 214 may store one or more frames and the predictive circuit 218 may generate additional samples after the end of a data stream associated with the current frame. These additional samples may be combined (e.g., faded-in) with samples in a subsequent frame.

Note that in some embodiments circuits 200 and/or 230 include fewer or additional components. Moreover, two or more components can be combined into a single component and/or a position of one or more components can be changed. In some embodiments, some or all of the functions illustrated in circuits 200 and/or 230 are implemented in software.

In an exemplary embodiment, control logic 220 detects an end of file in the data streams(s) 210. Then, detector 212 trims and discards 2036 samples from the end of the data file and/or 2036 samples from the beginning of the subsequent data file. Data streams associated with these files are sequentially forwarded to buffer 214. In parallel, the additional samples are generated by the predictive circuit 218. During the cross-fade interval 182 (FIG. 1D), these additional samples are cross-faded by filter circuit 216 with the samples from the subsequent data file.

In an alternative embodiment, an additional buffer is used to enable the selective combining of samples in consecutive data files during the cross-fade interval 182 (FIG. 1D). This is shown in FIG. 3, which presents a block diagram illustrating a circuit 300 to reduce media discontinuities. During normal operation of this circuit, decoder 212 outputs decoded data to buffer 312-1, which in turn forwards this data to filter circuit 216. This decoded data may also be output to buffer 312-2, which may time shift this decoded data relative to the decoded data in buffer 312-1.

When control logic 220 detects an end of file in data stream (s) 210, control logic 220 may instruct or command filter circuit 216 to selectively combine samples near the end of the data file with samples near the beginning of the subsequent data file. Alternatively, when the end of file is detected, control logic 220 may instruct or command optional switching mechanism 310-1 to selectively couple samples near the end of the data file to the buffer 312-2, which is large enough to fill quickly and can accommodate the decoded data used during the cross-fade operation. Then, when the data stream(s) include samples associated with the subsequent data file, control logic 220 may instruct or command optional switching mechanism 310-2 to selectively couple these stored samples to filter circuit 216, which combines them with the samples from the subsequent data file during the cross-fade interval 182 (FIG. 1D).

Note that in some embodiments circuit 300 includes fewer or additional components. Moreover, two or more components can be combined into a single component and/or a position of one or more components can be changed. In some embodiments, some or all of the functions illustrated in circuit 300 are implemented in software.

Figure 4:
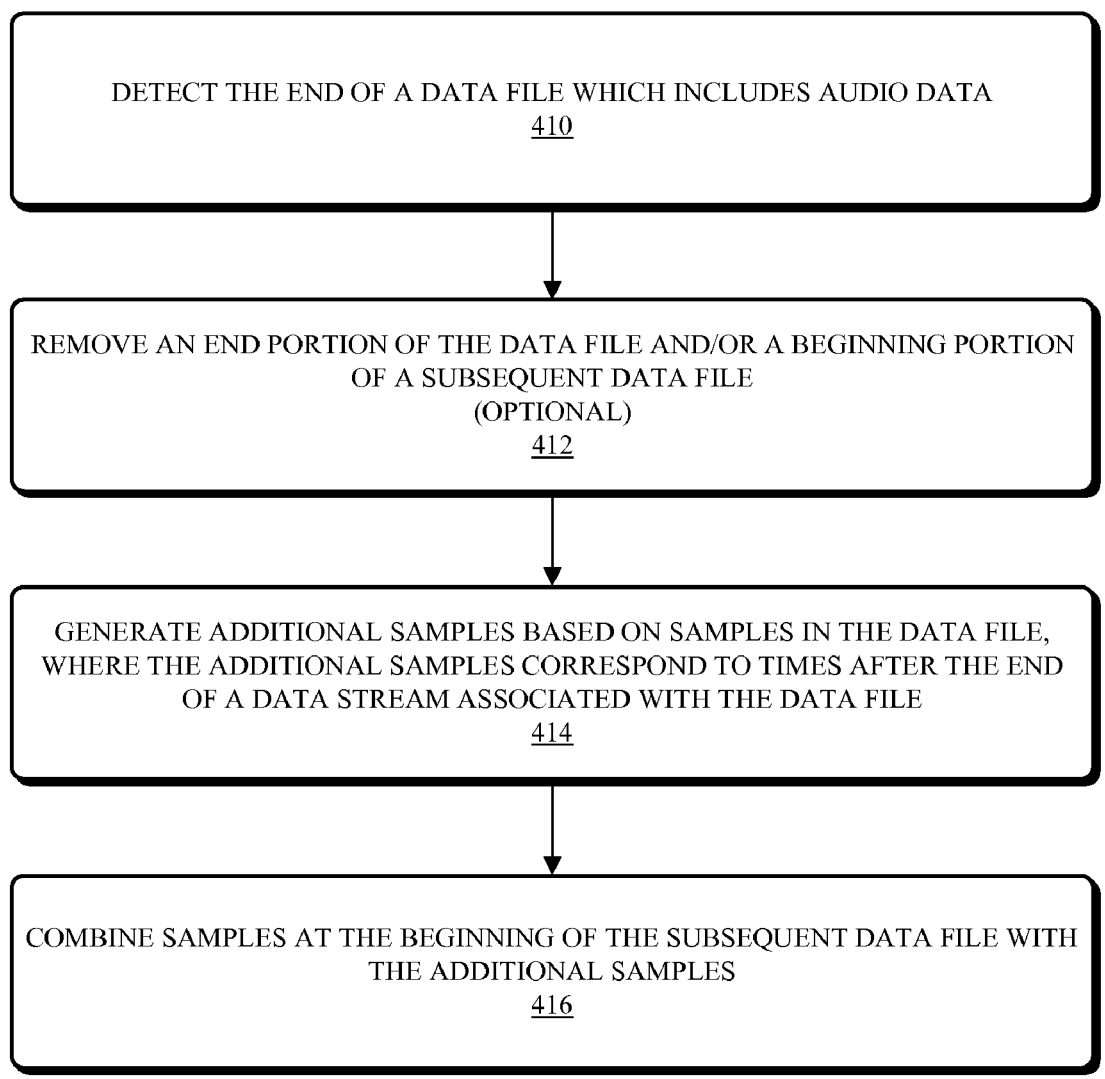
FIG. 4 is a flowchart illustrating a process for reducing media discontinuities in accordance with an embodiment of the present invention.

Processes for reducing or eliminating discontinuities in data streams associated with consecutive data files, which may be performed by a device and/or a system, in accordance with embodiments of the invention are now described. FIG. 4 presents a flowchart illustrating a process 400 for reducing media discontinuities, which may be implemented by the device and/or the system. During operation, the device detects the end of a data file which includes audio data (410). Next, the device optionally removes the end portion of the data file and/or the beginning portion of a subsequent data file (412).

Then, the device generates additional samples based on samples in the data file (414) and combines samples at the beginning of the subsequent data file with the additional samples (416). Note that the additional samples may correspond to times after the end of a data stream associated with the data file. In some embodiments of the process 400, there may be additional or fewer operations. Moreover, the order of the operations may be changed and two or more operations may be combined into a single operation.

Figure 5:
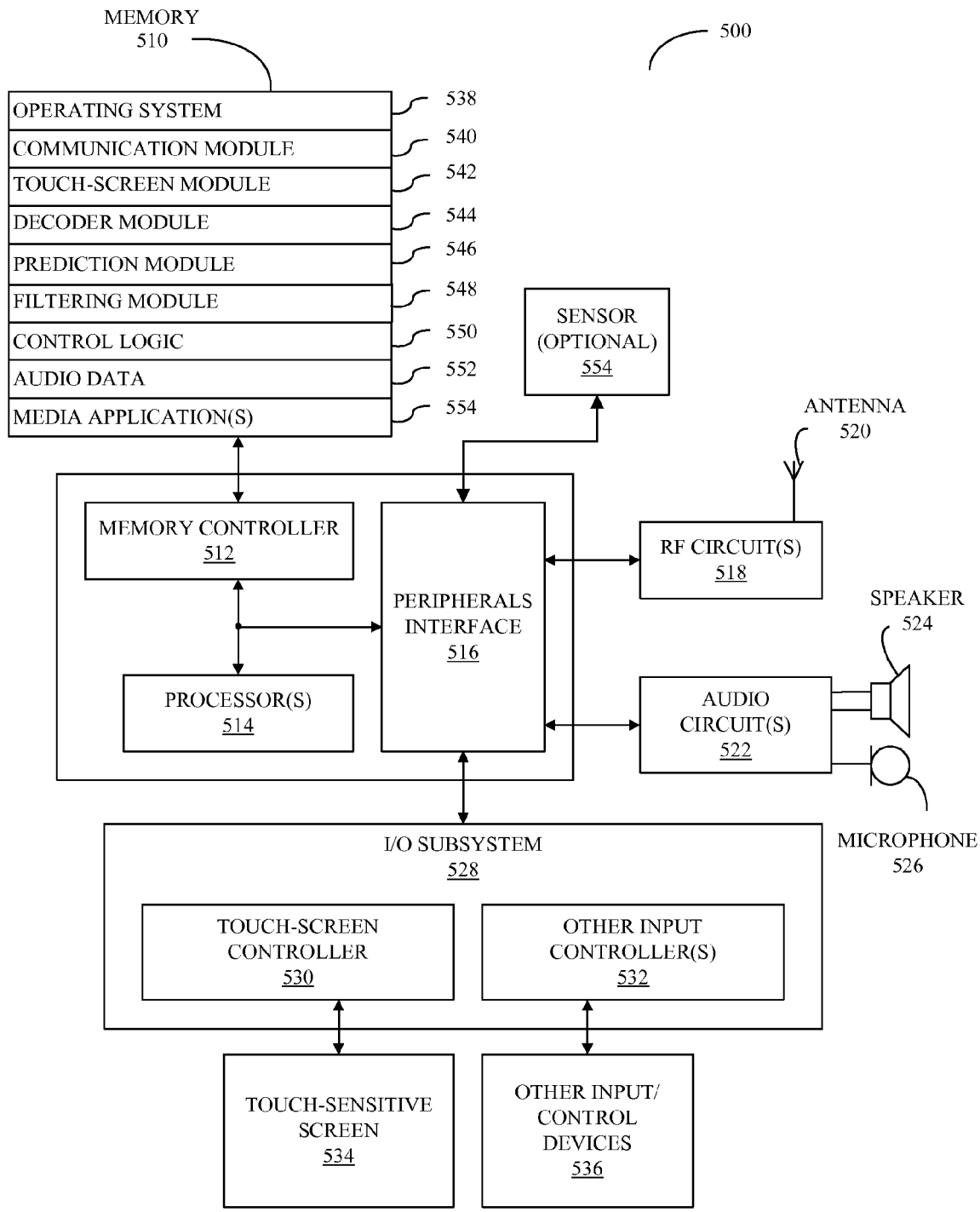
FIG. 5 is a block diagram illustrating a portable device in accordance with an embodiment of the present invention.

Devices and computer systems for implementing these techniques for reducing or eliminating discontinuities in consecutive data files in accordance with embodiments of the invention are now described. FIG. 5 presents a block diagram illustrating an embodiment of a portable device 500, which may include a touch-sensitive screen 534. This device may include a memory controller 512, one or more data processors, image processors and/or central processing units 514, and a peripherals interface 516. Moreover, the memory controller 512, the one or more processors 514, and/or the peripherals interface 516 may be separate components or may be integrated, such as on one or more integrated circuits. Note that the various components in the portable device 500 may be electrically coupled by one or more signal lines and/or communication buses.

Peripherals interface 516 may be electrically coupled to: an optional sensor 554 (such as CMOS or CCD image sensor), one or more RF circuits 518, one or more audio circuits 522, and/or an input/output (I/O) subsystem 528. These audio circuits 522 may be electrically coupled to a speaker 524 and a microphone 526. Note that the portable device 500 may support voice recognition and/or voice replication.

Moreover, the RF circuits 518 may be electrically coupled to one or more antennas 520 and may allow communication with one or more additional devices, computers and/or servers using a wireless network. Consequently, in some embodiments portable device 500 supports one or more communication protocols, including: code division multiple access (CDMA), global system for mobile communications (GSM), Enhanced Data GSM Environment (EDGE), Wi-Fi (such as IEEE 802.11a, IEEE 802.11b, IEEE 802.11g, and/or IEEE 802.11n), Bluetooth, Wi-MAX, a protocol for email, instant messaging, a simple message system (SMS), and/or any other suitable communication protocol (including communication protocols not yet developed as of the filing date of this document). In an exemplary embodiment, the portable device 500 is, at least in part, a cellular telephone.

In some embodiments, I/O subsystem 528 includes a touch-screen controller 530 and/or other input controller(s) 532. This touch-screen controller may be electrically coupled to a touch-sensitive screen 534. Moreover, the touch-sensitive screen 534 and the touch-screen controller 530 may detect contact and any movement or break thereof using any of a plurality of touch-sensitivity technologies, including but not limited to: capacitive, resistive, infrared, and/or surface acoustic wave technologies, as well as other proximity sensor arrays or other elements for determining one or more points of contact with the touch-sensitive screen 534. In an exemplary embodiment, the touch-sensitive screen 534 has a resolution in excess of 100 dpi, such as approximately 168 dpi.

Note that the other input controller(s) 532 may be electrically coupled to other input/control devices 536, such as: one or more physical buttons, a keyboard, an infrared port, a USB port, and/or a pointer device (such as a mouse). Moreover, the one or more physical buttons may include an up/down button for volume control of the speaker 524 and/or the microphone 526.

In some embodiments, the one or more physical buttons include a push button. By quickly pressing the push button, a user of the portable device 500 may disengage locking of the touch-sensitive screen 534. Alternatively, by pressing the push button for a longer time interval, the user may turn power to the portable device 500 on or off. Moreover, the touch-sensitive screen 534 may be used to implement virtual or soft buttons and/or a keyboard. Note that the user may be able to customize a functionality of one or more of the virtual and/or physical buttons.

In some embodiments, the portable device 500 includes circuits for supporting a location determining capability, such as that provided by the global positioning system (GPS). Moreover, the portable device 500 may be used to play back recorded music, such as one or more files, including MP3 files or AAC files. Consequently, in some embodiments the portable device 500 includes the functionality of an MP3 player, such as an iPod (trademark of Apple, Inc.). Therefore, the portable device 500 may include a connector that is compatible with the iPod™.

Memory controller 512 may be electrically coupled to memory 510. Memory 510 may include high-speed random access memory and/or non-volatile memory, such as: one or more magnetic disk storage devices, one or more optical storage devices, and/or FLASH memory. Memory 510 may store an operating system 538, such as: Darwin, RTXC, LINUX, UNIX, OS X, Windows, and/or an embedded operating system such as VxWorks. This operating system may include procedures (or sets of instructions) for handling basic system services and for performing hardware-dependent tasks. Moreover, memory 510 may also store communication procedures (or sets of instructions) in a communication module 540. These communication procedures may be used for communicating with one or more additional devices, one or more computers and/or one or more servers.

Memory 510 may include a touch-screen module 542 (or a set of instructions), a decoder module 544 (or a set of instructions), a prediction module 546 (or a set of instructions), a filtering module 548 (or a set of instructions), and/or control logic 550 (or a set of instructions). However, as noted previously the prediction module 546, the filtering module 548, and/or the control logic 550 may, at least in part, be implemented using dedicated hardware, such as a circuit in the audio circuit(s) 522, which includes the predictive circuit 218 (FIGS. 2A and 2B), the filter circuit 216 (FIGS. 2A and 2B), and/or control logic 220 (FIGS. 2A and 2B).

Touch-screen module 542 may provide graphics associated with the virtual buttons and/or keyboard. Moreover, the decoder module 544 may receive encoded data (not shown) to produce decoded audio data 552, which is consumed by one or more media applications 554. In some embodiments, the prediction module 546 may generate additional samples after the end of a data stream associated with the data file and the filtering module 548 may combine these additional samples with samples associated with the subsequent data file during the cross-fade interval 182 (FIG. 1D) based on instructions or commands from control logic 550.

Note that each of the above-identified modules and applications corresponds to a set of instructions for performing one or more functions described above. These modules (e.g., sets of instructions) need not be implemented as separate software programs, procedures or modules. Consequently, the various modules and sub-modules may be rearranged and/or combined. Moreover, memory 510 may include additional modules and/or sub-modules, or fewer modules and/or sub-modules. Therefore, memory 510 may include a subset or a superset of the above-identified modules and/or sub-modules.

Moreover, instructions in the various modules in the memory 510 may be implemented in a high-level procedural language, an object-oriented programming language, and/or in an assembly or machine language. The programming language may be compiled or interpreted, e.g., configurable or configured to be executed by the one or more processing units 514. Consequently, the instructions may include high-level code in a program module and/or low-level code, which is executed by the processor(s) 514 in the portable device 500. Note that various functions of the device 500 may be implemented in hardware and/or in software, including in one or more signal processing and/or application-specific integrated circuits.

Figure 6:
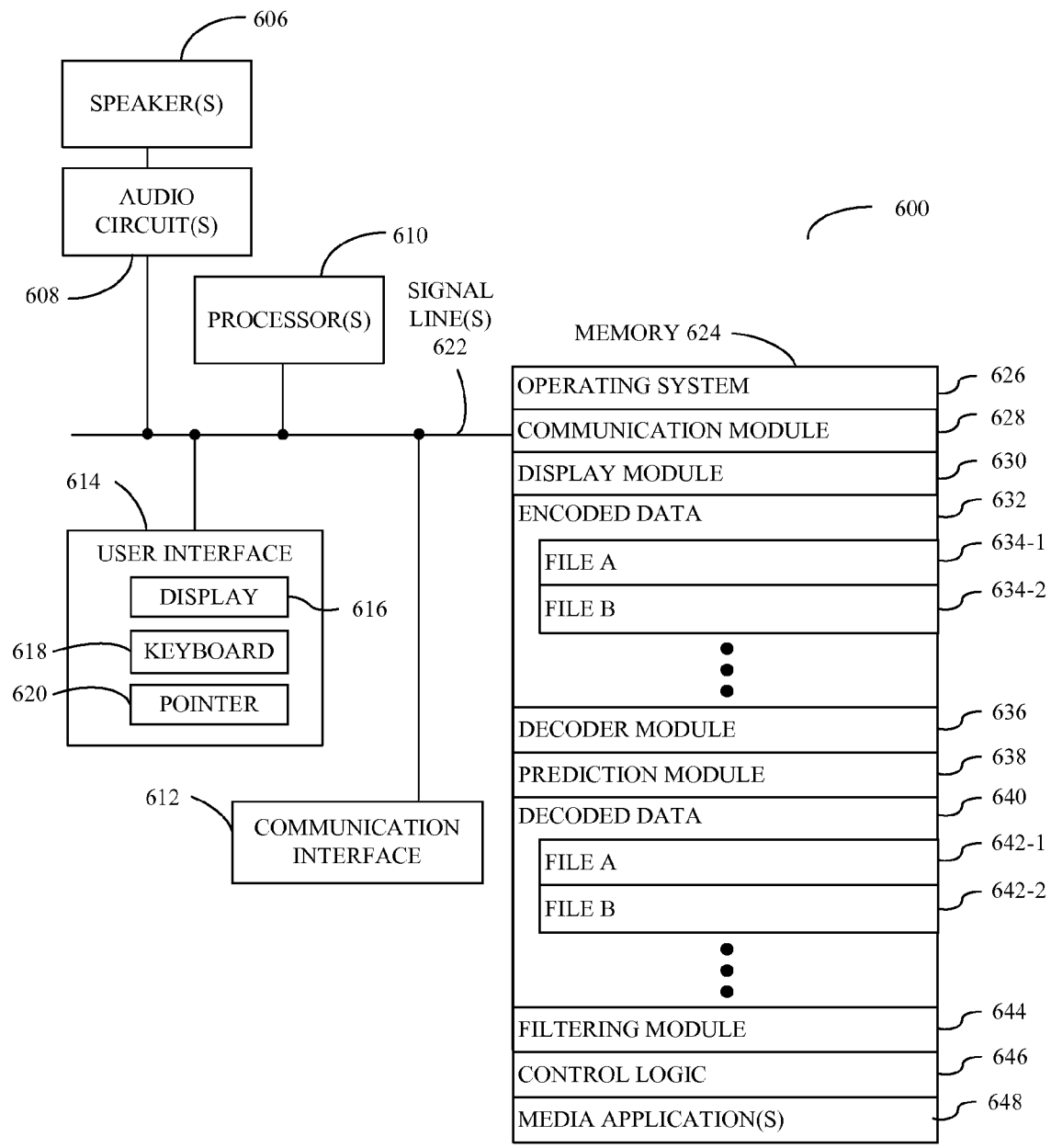
FIG. 6 is a block diagram illustrating a computer system in accordance with an embodiment of the present invention.

FIG. 6 presents a block diagram illustrating an embodiment of a computer system 600. Computer system 600 can include: one or more processors 610, a communication interface 612, a user interface 614, speakers 606, one or more audio circuit(s) 608, and/or one or more signal lines 622 electrically coupling these components together. Note that the one or more processing units 610 may support parallel processing and/or multi-threaded operation, the communication interface 612 may have a persistent communication connection, and the one or more signal lines 622 may constitute a communication bus. Moreover, the user interface 614 may include: a display 616, a keyboard 618, and/or a pointer 620, such as a mouse.

Memory 624 in the computer system 600 may include volatile memory and/or non-volatile memory. More specifically, memory 624 may include: ROM, RAM, EPROM, EEPROM, FLASH, one or more smart cards, one or more magnetic disc storage devices, and/or one or more optical storage devices. Memory 624 may store an operating system 626 that includes procedures (or a set of instructions) for handling various basic system services for performing hardware-dependent tasks. Memory 624 may also store communication procedures (or a set of instructions) in a communication module 628. These communication procedures may be used for communicating with one or more computers and/or servers, including computers and/or servers that are remotely located with respect to the computer system 600.

Memory 624 may include multiple program modules (or sets of instructions), including: display module 630 (or a set of instructions), decoder module 636 (or a set of instructions), prediction module 638 (or a set of instructions), filtering module 644 (or a set of instructions), and/or control logic 646 (or a set of instructions). However, as noted previously the prediction module 638, the filtering module 644, and/or the control logic 646 may, at least in part, be implemented using dedicated hardware, such as the one or more audio circuit(s) 608 driving the speakers 606, which may include the predictive circuit 218 (FIGS. 2A and 2B), the filter circuit 216 (FIGS. 2A and 2B), and/or control logic 220 (FIGS. 2A and 2B).

Display module 630 may provide graphics for display on display 616. Moreover, the decoder module 636 may receive encoded data 632 (such as file A 634-1 and/or file B 634-2) and may produce decoded data 640 (such as file A 642-1 and/or file B 642-2), which is consumed by one or more media applications 648. In some embodiments, the prediction module 638 may generate additional samples after the end of a data stream associated with the data file and the filtering module 644 may combine these additional samples with samples associated with the subsequent data file during the cross-fade interval 182 (FIG. 1D) based on instructions or commands from control logic 646.

Instructions in the various modules in the memory 624 may be implemented in a high-level procedural language, an object-oriented programming language, and/or in an assembly or machine language. The programming language may be compiled or interpreted, e.g., configurable or configured to be executed by the one or more processing units 610. Consequently, the instructions may include high-level code in a program module and/or low-level code, which is executed by the processor 610 in the computer system 600.

Although the computer system 600 is illustrated as having a number of discrete components, FIG. 6 is intended to provide a functional description of the various features that may be present in the computer system 600 rather than a structural schematic of the embodiments described herein. In practice, and as recognized by those of ordinary skill in the art, the functions of the computer system 600 may be distributed over a large number of servers or computers, with various groups of the servers or computers performing particular subsets of the functions. In some embodiments, some or all of the functionality of the computer system 600 may be implemented in one or more application-specific integrated circuits (ASICs) and/or one or more digital signal processors (DSPs).

Computer system 600 may include fewer components or additional components. Moreover, two or more components can be combined into a single component and/or a position of one or more components can be changed. In some embodiments the functionality of the computer system 600 may be implemented more in hardware and less in software, or less in hardware and more in software, as is known in the art.

Data structures that may be used in the portable device 500 (FIG. 5) and/or the computer system 600 in accordance with embodiments of the invention are now described. FIG. 7 presents a block diagram illustrating an embodiment of a data structure 700. This data structure may include one or more instances of predicted or additional data 710, which may be used to reduce or eliminate discontinuities when transitioning between data streams associated with consecutive data files in a sequence of data files. A given instance of the predicted data 710, such as predicted data 710-1, may include multiple samples 714. In some embodiments, each of these samples is associated with one of times 712.

Note that in some embodiments of the data structure 700 there may be fewer or additional components. Moreover, two or more components can be combined into a single component and/or a position of one or more components can be changed.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An integrated circuit, comprising:
a decoder circuit configured to receive encoded audio data and to output decoded audio data including data streams associated with a data file and a subsequent data file;
a predictive circuit electrically coupled to the decoder circuit, which is configured to selectively generate additional samples based on samples in the data file, wherein the additional samples correspond to times after the end of a data stream associated with the data file;
a filter circuit electrically coupled to the decoder circuit and selectively electrically coupled to the predictive circuit, which is configured to selectively combine samples at a beginning of the subsequent data file with the additional samples; and
control logic electrically coupled to the decoder circuit, wherein the control logic is configured to instruct the decoder circuit to discard a portion of the data stream associated with the data file without decoding the portion of the data stream, wherein the times after the end of the data stream correspond to times for the portion of the data stream.

2. The integrated circuit of claim 1, wherein the combining includes fading out the additional samples and fading in the samples at the beginning of the subsequent data file.

3. The integrated circuit of claim 1, wherein the decoder circuit is configured to remove an end portion of the data file and/or a beginning portion of the subsequent data file.

4. The integrated circuit of claim 1, wherein the combining reduces a discontinuity in samples at the end of the data file and samples at the beginning of the subsequent data file.

5. The integrated circuit of claim 4, wherein the discontinuity comprises an intensity discontinuity.

6. The integrated circuit of claim 4, wherein the discontinuity comprises a phase discontinuity.

7. The integrated circuit of claim 1, wherein the control logic is further configured to detect the end of the data file and configured to selectively electrically couple the predictive circuit to the filter circuit.

8. The integrated circuit of claim 7, wherein the control logic is configured to enable the selective combining.

9. The integrated circuit of claim 7, wherein the control logic is configured to activate the predictive circuit when the end of the data file is detected.

10. The integrated circuit of claim 9, wherein the predictive circuit is trained when it is activated.

11. The integrated circuit of claim 1, wherein the predictive circuit comprises a filter.

12. The integrated circuit of claim 11, wherein the filter has a finite impulse response.

13. The integrated circuit of claim 11, wherein the filter has an infinite impulse response.

14. The integrated circuit of claim 11, wherein the filter comprises an adaptive filter.

15. The integrated circuit of claim 1, further comprising a memory buffer electrically coupled to the decoder circuit and the filter circuit.

16. The integrated circuit of claim 1, wherein generation of the additional samples involves extrapolating the samples in the data file.

17. A circuit, comprising:
a decoder circuit configured to receive encoded audio data and to output decoded audio data including data streams associated with a data file and a subsequent data file;
a predictive circuit electrically coupled to the decoder circuit, which is configured to selectively generate additional samples based on samples in the data file, wherein the additional samples correspond to times after the end of a data stream associated with the data file;
a filter circuit electrically coupled to the decoder circuit and selectively electrically coupled to the predictive circuit, which is configured to selectively combine samples at a beginning of the subsequent data file with the additional samples; and
control logic electrically coupled to the decoder circuit, wherein the control logic is configured to instruct the decoder circuit to discard a portion of the data stream associated with the data file without decoding the portion of the data stream, wherein the times after the end of the data stream correspond to times for the portion of the data stream.

18. A circuit, comprising:
a decoder circuit configured to decode encoded audio data and configured to trim portions of two adjacent data files;
a predictive circuit electrically coupled to the decoder circuit, which is configured to selectively extrapolate samples in a first of the two adjacent data files to generate additional samples;
a filter circuit electrically coupled to the decoder circuit and selectively electrically coupled to the predictive circuit, which is configured to selectively blend the additional samples with samples in a second of the two adjacent data files; and
control logic electrically coupled to the decoder circuit, wherein the control logic is configured to instruct the decoder circuit to discard a portion of the first data file without decoding the portion, wherein times for the additional samples correspond to times for the portion of the data stream.

19. A portable device, comprising a processor, and an audio codec configured to decode and playback encoded data files and configured to reduce a discontinuity in samples at the end of a data file and samples at the beginning of a subsequent data file by combining the samples in the subsequent data file with additional samples extrapolated from the samples in the data file, wherein the audio codec is configured to discard a portion of the data file without decoding the portion, and wherein the additional samples correspond to times for the discarded portion of the data file.

20. A method for reducing media discontinuities, comprising:
detecting the end of a data file which includes audio data;
removing an end portion of the data file and/or a beginning portion of a subsequent data file without decoding encoded data associated with the removed portion;
generating additional samples based on samples in the data file, wherein the additional samples correspond to times for the removed portion; and
combining samples at the beginning of the subsequent data file with the additional samples.

* * * * *